US 9,041,657 B2

(12) United States Patent
Osman

(10) Patent No.: US 9,041,657 B2
(45) Date of Patent: May 26, 2015

(54) ERGONOMIC KEYBOARD

(75) Inventor: Mohamed Zaki Ramadan Osman, Cairo (EG)

(73) Assignee: KING SAUD UNIVERSITY, Riyadh (SA)

( * ) Notice: Subject to any disclaimer, the term of this patent is extended or adjusted under 35 U.S.C. 154(b) by 63 days.

(21) Appl. No.: 14/001,169

(22) PCT Filed: May 18, 2011

(86) PCT No.: PCT/US2011/037067
§ 371 (c)(1),
(2), (4) Date: Aug. 22, 2013

(87) PCT Pub. No.: WO2012/158170
PCT Pub. Date: Nov. 22, 2012

(65) Prior Publication Data
US 2013/0335331 A1    Dec. 19, 2013

(51) Int. Cl.
*G09G 5/00* (2006.01)
*G06F 3/02* (2006.01)
*G06F 3/01* (2006.01)
*G06F 3/023* (2006.01)

(52) U.S. Cl.
CPC *G06F 3/02* (2013.01); *G06F 3/018* (2013.01); *G06F 3/0233* (2013.01)

(58) Field of Classification Search
CPC ....... G06F 3/018; G06F 17/2863; G06F 3/02; G06F 3/0219; G06F 17/2223; G06F 3/0238; B41J 5/107
USPC .......... 345/168, 171, 172; 400/486, 489, 110, 400/109; 341/22
See application file for complete search history.

(56) References Cited

U.S. PATENT DOCUMENTS 4,906,117 A * 3/1990 Birdwell ........................ 400/490
(Continued)

FOREIGN PATENT DOCUMENTS

KR    10-2005-0036945    4/2005

OTHER PUBLICATIONS

Eggers, J., Feillet, D., Kehl S., Wagner, M.O, Yannou, B: "Optimization of the keyboard arrangenment problem using Ant Colonty algortithm". European Journal of Operational Research 148(3), 672-686 (2003).*

(Continued)

*Primary Examiner* — Koosha Sharifi-Tafreshi
(74) *Attorney, Agent, or Firm* — Richard C. Litman

(57) ABSTRACT

An ergonomic keyboard is described. In one aspect, a keyboard layout for a subject language is developed by determining a percent of frequency of monograph characters and digraphs of characters used in writing in the subject language. Thereafter, each key for the characters from each most frequent digraph is positioned under different hands on the keyboard layout, on a middle row of the keyboard layout, and under the index or middle fingers of a keyboard user. Other most frequent characters are positioned in the middle row of the keyboard layout or in a position on the keyboard layout to be struck using the index or middle fingers. The least frequent monograph characters are positioned in the bottom and top rows of the keyboard, with the least frequent characters under pinky fingers of a keyboard user. An optimized Arabic keyboard layout is also disclosed.

10 Claims, 5 Drawing Sheets

(56) References Cited

U.S. PATENT DOCUMENTS

| | | | |
|---|---|---|---|
| 8,402,357 B1* | 3/2013 | Norwood et al. | 715/202 |
| 2006/0088357 A1* | 4/2006 | Wedding | 400/489 |
| 2007/0009303 A1 | 1/2007 | Kurriss | |
| 2010/0110015 A1 | 5/2010 | Ahn et al. | |
| 2011/0090151 A1 | 4/2011 | Huang et al. | |
| 2011/0242000 A1* | 10/2011 | Bi et al. | 345/171 |

OTHER PUBLICATIONS

Tareq M Malas, Sinan S Taifour, Gheith A Abandah, "Toward Optimal Arabic Keyboard Layout Using Genetic Algorithm", In Proc. 9th Int'l Middle Eastern Multiconference on Simulation and Modeling (MESM 2008), Aug. 26-28, Amman, Jordan.*

* cited by examiner

ERGONOMIC KEYBOARD

BACKGROUND

Existing Arabic-language keyboard layouts have been designed without studying the impact of the current arrangement of the characters on the users' behavior while typing. Those layouts cause adverse effects because they distribute total typing loads in an irregular manner in terms of more excessive and disproportionate stress on the fingers. In other words, current Arabic-language keyboard layouts have a profound negative impact on the efficiency of a typist. For example, existing ill-designed Arabic-language keyboards place a disproportionately high load on the weaker fingers of the typist's hand. These designs lead to typing fatigue and even musculoskeletal injuries in the long term.

Currently, there are three major Arabic-language keyboard layouts. FIG. 1 shows prior art conventional Arabic typewriter keyboard layout 100. This keyboard layout first appears on the first Arabic typewriters made by Philip Wakid and Saleem Haddad in 1914. FIG. 2 shows prior art IBM® PC Arabic keyboard layout 200. This layout was derived from the layout used in Arabic electric or mechanical typewriters, such as shown in FIG. 1. The Unicode version of this keyboard was developed by IBM® and/or MICROSOFT®. This keyboard layout was primarily adopted to address mechanical typewriter key-sticking problems and is an intuitive-based design that does not promote learning to type.

FIG. 3 shows prior art APPLE® Arabic keyboard layout 300. This MAC® Arabic keyboard layout was developed by APPLE® to ease Arabic typing for those who are already familiar with an English keyboard layout. However the APPLE® keyboard layout is not optimized to increase the typing speed and does not promote learning to type.

FIG. 4 shows prior art Sakhr/MSX Arabic keyboard layout 400. The Sakhr Company developed this layout. This keyboard layout is not popular in mainstream use, and it is not optimized for typing characteristics such as "modifier overhead" (i.e., shift key) use, alteration of hands or fingers, and key strike direction.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An ergonomic keyboard is described. In one aspect, a keyboard layout for a subject language is developed by determining a percent of frequency of monograph characters and digraphs of characters used in writing in the subject language. Thereafter, each key for the characters from each most frequent digraph is positioned under different hands on the keyboard layout, on a middle row of the keyboard layout, and under the index or middle fingers of a keyboard user. Other most frequent characters are positioned in the middle row of the keyboard layout or in a position on the keyboard layout to be struck using the index or middle fingers. The least frequent monograph characters are positioned in the bottom and top rows of the keyboard, with the least frequent characters under pinky fingers of a keyboard user. An optimized Arabic keyboard layout is also disclosed.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIG. 3 shows a prior art Apple® Arabic keyboard layout.

FIG. 4 shows the prior art Sakhr/MSX Arabic keyboard layout.

DETAILED DESCRIPTION

Overview

The first step for developing a keyboard layout is to determine both monograph and digraph of the characters used in writing in the subject language. In one implementation, this corpus is created using gathered texts, for example texts from leading (e.g., public domain) e-books that are available on the Internet or in libraries. A frequency analysis is then carried out on the texts, both of the characters, and among characters (i.e., monograph and digraph). The percent of frequencies of characters and the frequencies among pair of the characters (e.g., digraph values) is determined. Thereafter, one or more metaheuristic optimization algorithms such as a tabu search, genetic algorithm, simulated annealing, or ant colony optimization algorithm may be employed to optimize the keyboard layout. Regardless, each key for the characters from the most frequent key-pairs (digraphs) is placed under different hands, on the middle row, and under the strongest fingers (i.e., the index and the middle fingers). Next, the remaining most frequent characters are placed in the middle row and/or in position to be struck using the strongest fingers. Then, the least frequent letters are placed in the bottom and top rows with most of them are under the weakest fingers (i.e., the pinky fingers.) In accordance with some embodiments, an algorithm is not used to optimize a shift set, or the like if it is not frequently used in the subject language.

A statistical study of Arabic texts in accordance with the foregoing procedure leads to a new standard and optimized Arabic keyboard layout in accordance with the present invention. The present keyboard design is consistent with the capability of human fingers and character frequency within the Arabic language structure. The resulting optimum Arabic keyboard layout creates scientifically proportionate and statistically induced character mapping that allow for minimum typing effort, maximize typing speed, reduce typing errors, and allow easy learning of touch typing. This keyboard provides an Arabic keyboard configuration that decreases pain and occupational illness. The developed keyboard performs relatively 9% faster and is more easily learned than current Arabic keyboards.

These and other aspects of the systems and methods for developing a keyboard layout for a subject language, as well as the resulting optimized Arabic keyboard layout are now described in greater detail.

Exemplary Procedure for Providing an Ergonomic Keyboard Layout

Figure 5:
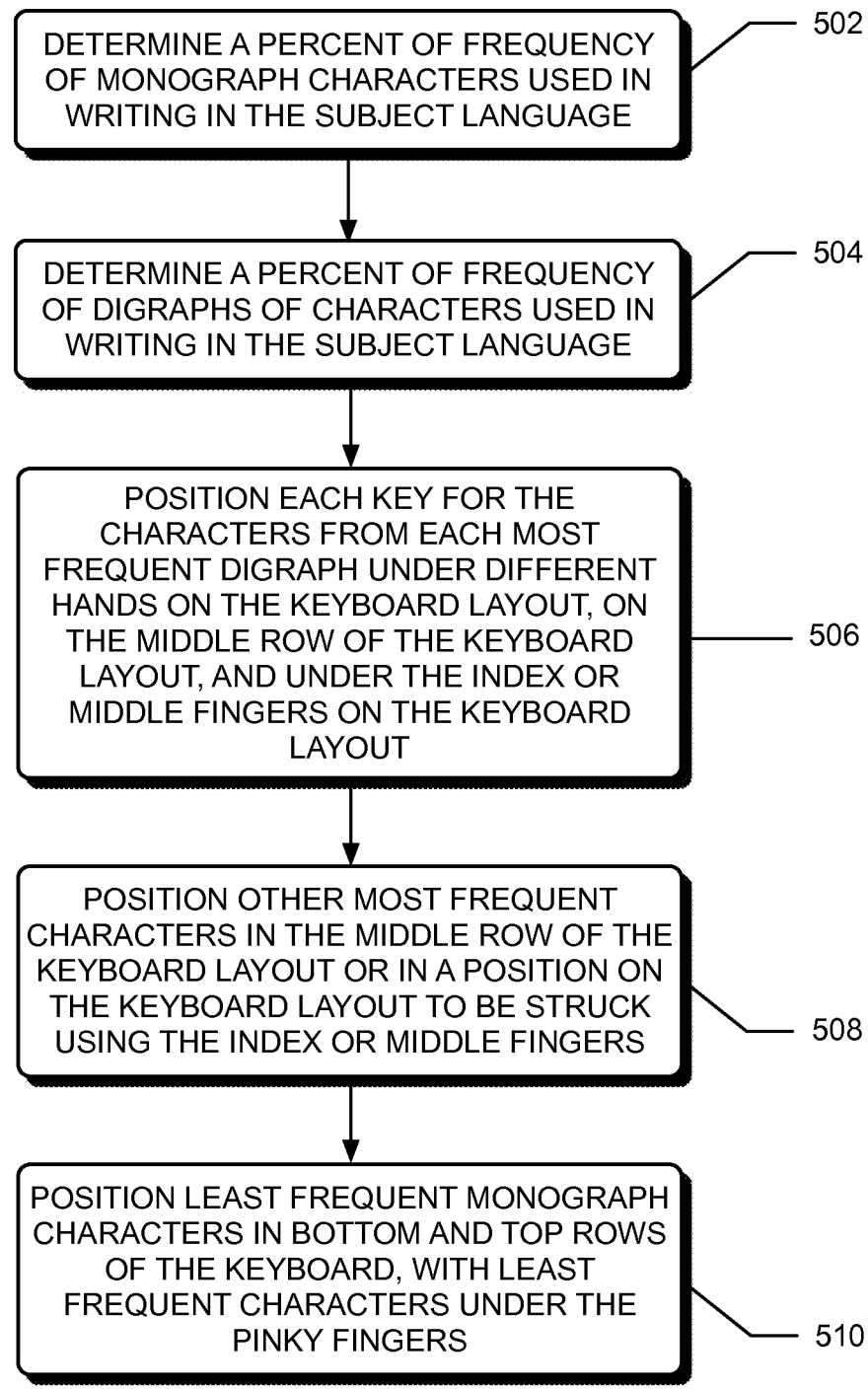
FIG. 5 is a flowchart showing an exemplary procedure for providing an ergonomic keyboard layout, according to one embodiment.

FIG. 5 is a flowchart showing exemplary procedure 500 for providing an ergonomic keyboard layout, according to one embodiment. The first steps for developing an ergonomic keyboard layout are to determine both monographs and digraphs of the subject language. At 502, a percent of frequency of monograph characters used in writing in the subject language is determined. At block 504, a determination is made as to the percent of frequency of digraphs of characters used in writing in the subject language. The determination of the percent of frequency of digraphs of characters at 504 might be carried out by determining a percent of frequency among pairs of the characters to arrive at a percent of frequency of digraphs of characters used in writing in the subject language. In accordance with various implementations, the determinations made at 502 and 504 may be carried out using gathered texts in the subject language. Such gathered texts, for example, include public domain books such as e-books, which may be gathered from the Internet, or similar sources.

In particular, the determination made at 502 of the percent of frequency of monograph characters may be carried out using a frequency analysis on the gathered texts of the characters to determine monograph characters used in writing in the subject language; whereas, determining the percent of frequency of digraphs of the characters at 504 might be carried out by a frequency analysis on the gathered texts among the characters to determine a percent of frequency of digraphs of characters used in writing in the subject language.

Figure 7:
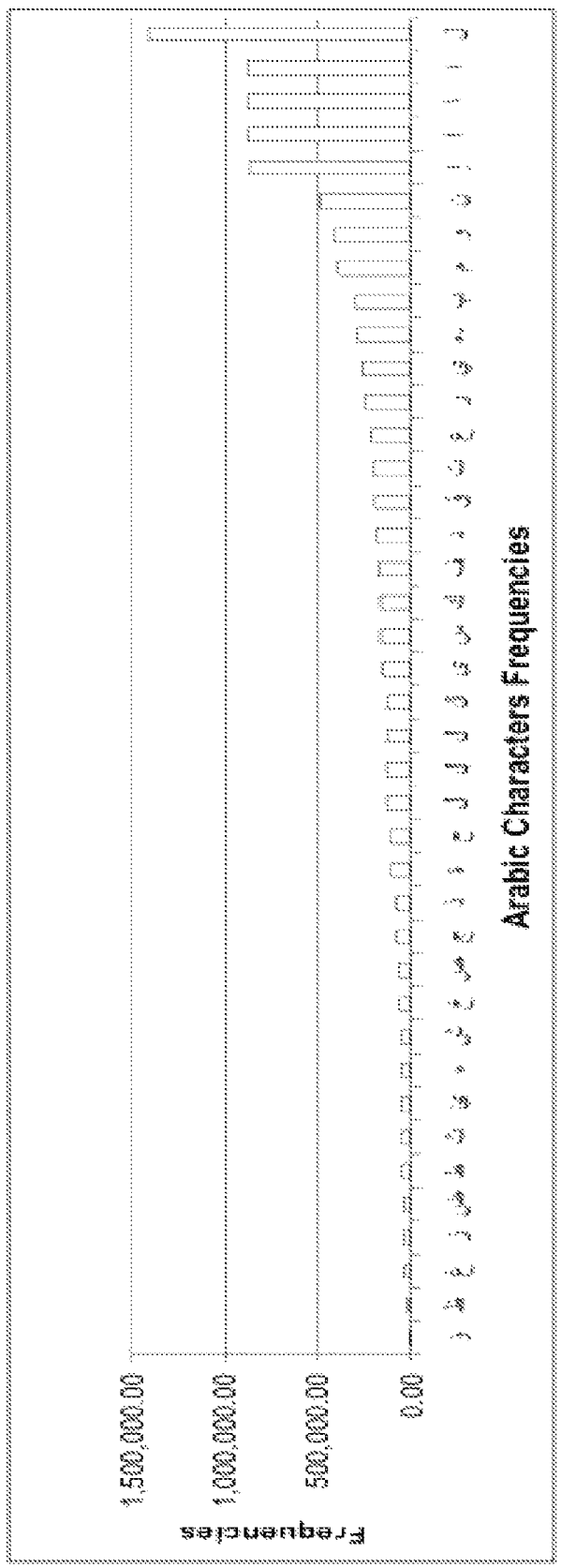
FIG. 7 shows an exemplary table of Arabic characters frequencies.

In a particular implementation of the present procedure, a corpus was created using gathering texts from leading Arabic e-books that are available on the Internet. Altogether 54 e-books were collected for this purpose, which consisted of 7,262,260 characters. The frequency analysis from 502 and 504 was carried out for both characters and among characters (i.e., monograph and digraph). The five highest frequency Arabic characters were found to be: Alef "ا" 13.2%, Lam "ل" 11.1%, Ya "ي" 7%, Waw "و" 6.8%, and Meem "م" 6.1%. The five least frequent Arabic characters were found to be: Hamza "ء" 0.6%, Ghain "غ" 0.5%, Ya_Hamza "ئ" 0.3%, Zhoa "ظ" 0.2%, and Waw_Hamza "ؤ" 0.1%. The percent of frequencies among pairs of Arabic characters (e.g., digraph values) analysis determined that the most frequent pair was Alef "ا" followed by Lam "ل", at 6.88%; with Lam "ل" followed by Nun "ن" at 1.49%; and Waw "و" followed by Alef "ا" at 1.13%. See FIG. 7.

At 506, each key for the characters from each of the most frequent digraph are positioned on a keyboard layout under a different hand of the user, on a middle row of the keyboard layout, and under index or middle fingers of the keyboard user.

For example, in an Arabic keyboard layout optimized in accordance with an implementation of the present procedure, ق, ف, غ, ع, ه, ت, ب, ل, ا, د, م, ن, لا, ي, ى, and ر keys may be disposed in central portion of a keyboard, for striking by the index or middle fingers of a keyboard user.

At 508, remaining ones of the most frequent (monograph) characters are positioned on remaining keys on the middle row of the keyboard layout and/or a positioned on the keyboard layout to be struck using the index or middle fingers.

For example, in the Arabic keyboard layout optimized in accordance with an implementation of the present procedure, ض, ص, ح, ج, ث, و, ذ, ز, and ك keys may be disposed in intermediate areas of the keyboard, i.e., between the central portion containing the characters from each of the most frequent digraphs and the periphery of the keyboard.

At 510, the less frequent (monograph) characters are positioned in bottom and top rows of the keyboard, with least frequent characters positioned under the pinky fingers of a keyboard user.

For example, in the Arabic keyboard layout optimized in accordance with an implementation of the present procedure, ظ, خ, ء, ط, س, ش, ئ, and ة keys may be disposed in peripheral areas of the keyboard, for striking with the pinky fingers of a keyboard user.

The positioning in steps 506, 508, and/or 510 may be carried out, at least in part, by applying an optimized algorithm, such as an ant colony algorithm, tabu search, genetic algorithm, or simulated annealing.

Exemplary Ergonomic Arabic Keyboard Layout

Figure 6:
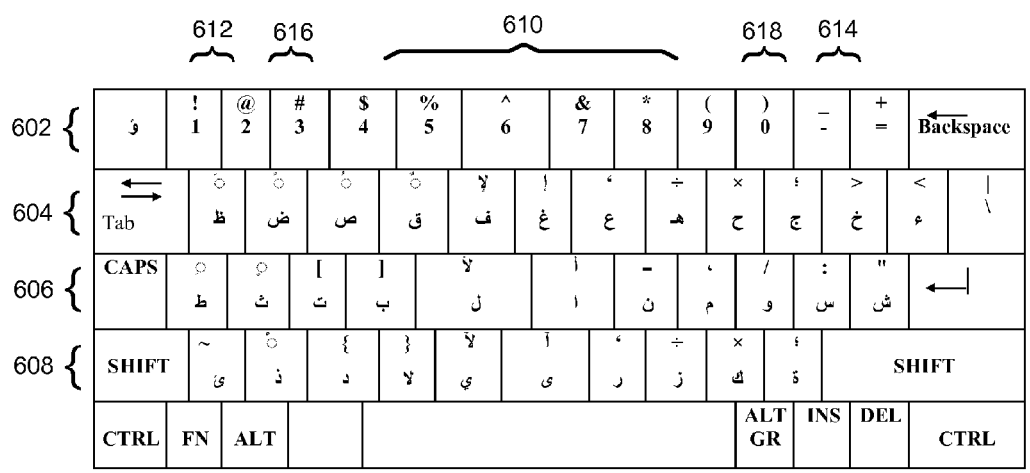
FIG. 6 shows an ergonomic Arabic letter keyboard layout, according to one embodiment.

FIG. 6 shows ergonomic Arabic letter keyboard 600, according to one embodiment. Keyboard 600 might be produced as a result of application of procedure 500 for providing an ergonomic keyboard layout, such as in the Arabic-language example discussed above with respect to procedure 500.

Optimized Arabic keyboard 600 comprises a first, topmost row 602 of keys including Arabic numerals 1 through 9 and 0. In accordance with various embodiments, the first row of keys 602 is arranged, from left to right, with Arabic numerals 1 through 9 and 0. First row 602 may also include ؤ as the left most key. A lower, second row of keys 604 includes ظ, ض, ص,ق , ف, غ, ع, ه, ح, ج, خ, and ء . In accordance with some embodiments, the second row of keys 604 is arranged, from left to right, ظ, ض, ص,ق , ف, غ, ع, ه, ح, ج, خ, and ء . The third row of keys 606 includes ط, ث, ت, ب, ل, ا, ن, م, و, س, and ش and according to some embodiments, the third row 606 is arranged, from left to right, ط ث ث, ت, ب, ل, ا, ن, م, و, س, and ش . The fourth row of keys 608 includes ذ, ئ, د, لا, ي, ى, ر, ز, ك, and ة, and in accordance with certain embodiments is arranged from left to right, ئ, ذ, د, لا, ي, ى, ر, ز, ك, and ة .

In accordance with the illustrated embodiment of keyboard layout 600, the ل, ب, ت, ه, ع, غ, ف ق, ا, ن, م, د, لا , ى, ي, and ر keys are disposed in the central portion 610 of keyboard 600, for striking by the index or middle fingers of a keyboard user. In accordance with this illustrated embodiment, the ظ, خ, ء, ط, س, ش, ئ, and ة keys are disposed in peripheral areas 612 and 614 of keyboard 600 for striking with the smaller (pinky) fingers of a keyboard user. Further, in accordance with keyboard layout embodiment 600 shown in FIG. 6, the ض, ص, ح, ج, ث, و, ذ, ز, and ك keys are disposed in areas 616 and 618 of keyboard 600, between central portion 610 and peripheral areas 612 and 614, respectively.

In accordance with various embodiments, various accents may be provided by shifted keys, for example: the ظ key shifted might provide $\bar{О}$ ; the ض key shifted might provide $\acute{О}$ ; the ص key shifted might provide $\grave{О}$ ; the ق key shifted might provide Ö ; the ط key shifted might provide Ǫ ; the ث key shifted might provide Ǫ ; and the ذ key shifted might provide Ö.

In accordance with some embodiments, various other characters may be provided by shifted keys, for example: the ف key shifted might provide ﻹ; the غ key shifted might provide ﻹ; the ل key shifted might provide ﻹ; the ا key shifted might provide إ; the ي key shifted might provide ﻹ; and the ى key shifted might provide إ. In accordance with certain embodiments, various symbols or punctuation marks may be provided by shifted keys, for example: the ع key shifted might provide '; the ه key shifted might provide ÷; the ح key shifted might provide X; the ج key shifted might provide ⁺; the خ key shifted might provide <; the ء key shifted might provide >; the ت key shifted might provide [; the ب key shifted might provide ]; the ن key shifted might provide -; the م key shifted might provide '; the و key shifted might provide /; the س key shifted might provide :; the ش key shifted might provide "; the ى key shifted might provide ~; the د key shifted might provide {; the ﻹ key shifted might provide}; the ر key shifted might provide '; the ز key shifted might provide ÷; the ك key shifted might provide X; and the ة key shifted might provide '.

Thus, layout 600 has the most common letters located in the comfortable home row and gives good hand alternation. For example, the most frequent key-pair Alef and Lam "ل, ا" are under different hands, on the middle row, and under the strongest fingers (the index and the middle fingers). Most of the frequent letters are placed in the middle row and/or using the strongest fingers, as in the case of Waw "و", and Teh "ت". The least frequent letters are placed in the bottom and top rows, and most of them are under the smallest "pinky" finger (the weakest finger), as in the case of Tah "ط", and Wow-Hamza "ؤ".

A keyboard such as keyboard 600 may be evaluated based on certain criteria. For example, each pair of letter-keys that has high frequency should be sited adjacent to each other considering its execution time. A score for a keyboard may be taken as a weighted sum of these individual scores. This score may be calculated by summing up the product of each frequency corresponding diagraphs $f_{d_i}$ with its execution time $t_i$ and its learnability index $l_i$. In addition, some Arabic characters would be easy to be learned if their locations very close to their family such as "ص" and "ض". Those families are grouped together through using high priority values. Remaining letters have $l_i$ which is equal to unity. The greater the distance between the two keys of high frequency in a diagraph, the highest penalizing a consecutive usage and learnability index $l_i$, as shown in Table 1. Therefore, $$\text{Min. } \mu = \sum_i f_{d_i} l_i t_i \quad (1)$$

where $f_{d_i}$ is the frequency of the digraphs, $t_i$ is typing time for hitting a pair of letter-keys; and can be estimated using the following equation 2 and Table 2:

$$t_i = 185.5 - 0.013 f_{d_i} - 40.0 Ha + 18.3 ro - 11.0 fi + 0.514 R + 1.07 F \quad (2)$$

TABLE 1

Arabic characters' family (learnability index $l_i$.)

| Family # | Characters | $l_i$ |
|---|---|---|
| 1 | آ, إ, أ, ا | (18616 + 18616 + 18615 + 20935)*/28 |
| 2 | ب, ت, ث | (3989 + 15595 + 25191)/28 |
| 3 | ج, ح, خ | (3673 + 11515 + 7781)/28 |
| 4 | د, ذ | (13488 + 25815)/28 |
| 5 | ر, ز | (290827 + 49961)/28 |
| 6 | س, ش | (4831 + 10800)/28 |
| 7 | ص, ض | (5127 + 5595)/28 |
| 8 | ط, ظ | (1555 + 5511)/28 |
| 9 | ع, غ | (2864 + 16553)/28 |
| 10 | ف, ق | (31358 + 19319)/28 |

TABLE 2

Parameters affect typing time for hitting sequence letter-keys.

| Parameters | Symbol | Values |
|---|---|---|
| Hand transition | Ha | 0 = same hand used, 1 = alternate hand used |
| Row transition | ro | Number of rows moved across in the same hand transition, set to 0 for alternate hand motions. |
| Finger transition | fi | The distance of finger columns in the same hand, set to 0 for alternate hand motions. |
| Row weight | R | Linear sum of weights for each row position, where the weights given are 1, 2, and 3 for home, upper, and bottom row, respectively. |
| Finger weight | F | Linear sum of weights on each of the finger positions of the key pair, where the weights given are 4.5, 4.5, 1, 2, and 3 from the outer column inwards. |

Figure 1:
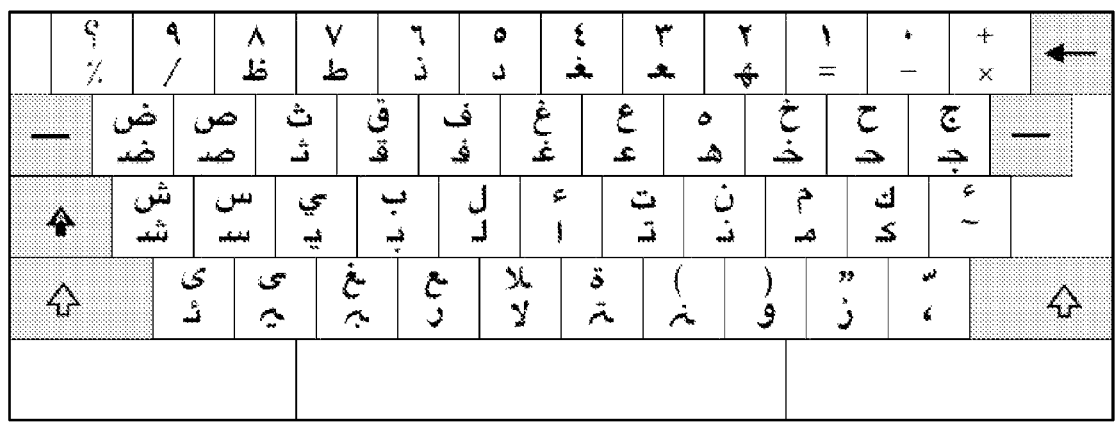
FIG. 1 shows a prior art conventional Arabic typewriter keyboard layout.
Figure 2:
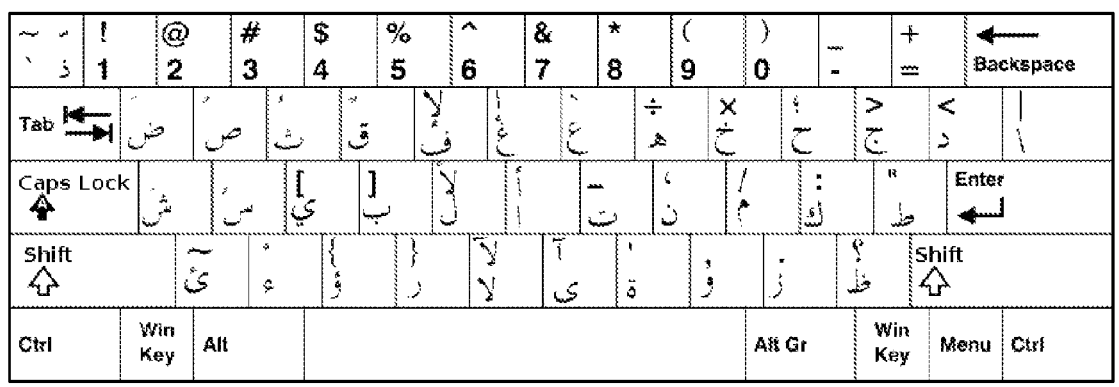
FIG. 2 shows a prior art IBM® PC Arabic keyboard layout.
Figures 3, 4:
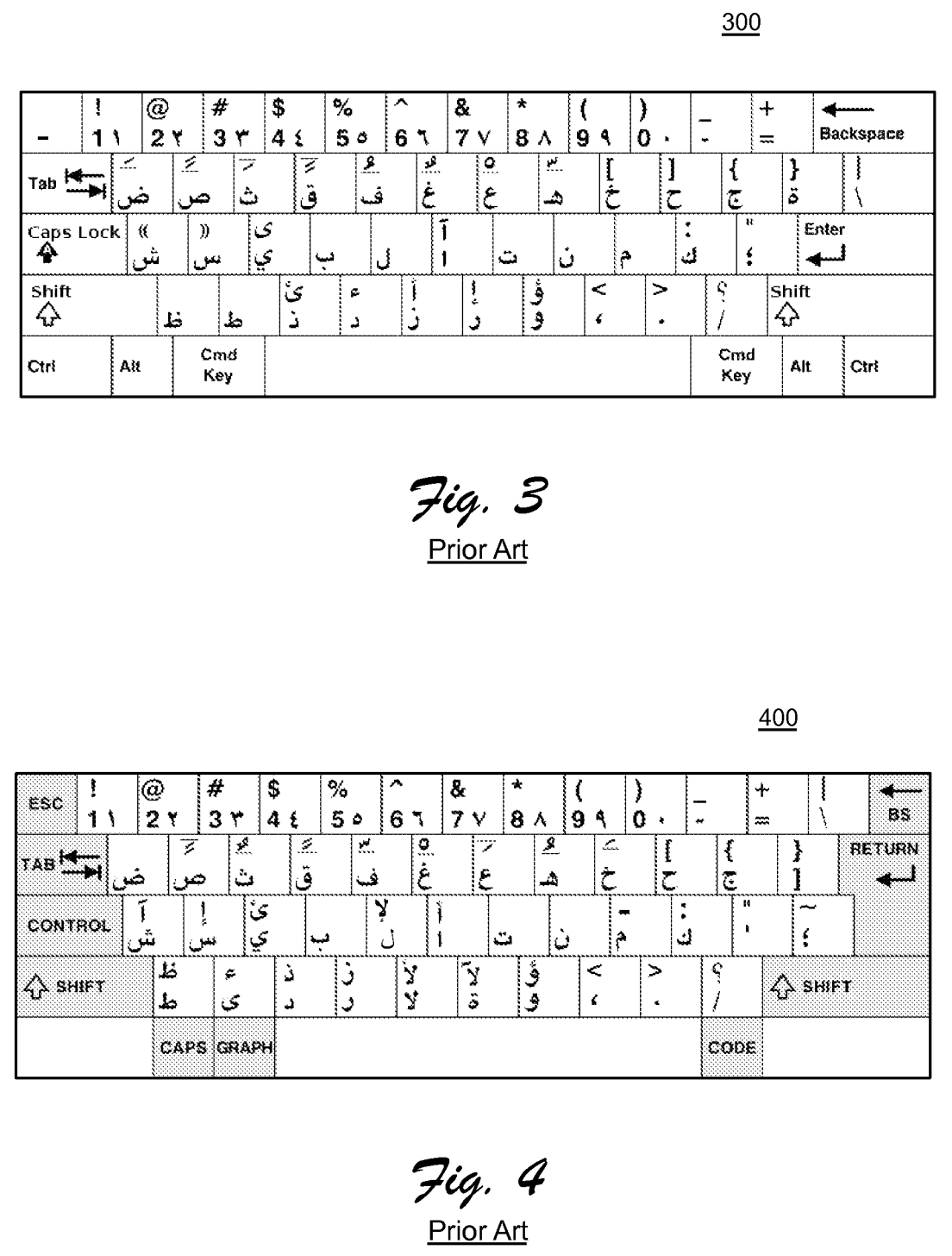

A comparison was made between optimized keyboard layout 600 and other layouts, such as shown in FIGS. 2-4 above, by applying the fitness function. Table 3 presents the results of this comparison, with A, B, and C corresponding to keyboards 200, 300 and 400, respectively. Taking the interval between the worst and optimized layouts as a reference base, optimized layout 600 is 9%, 37%, and 23% better than keyboards "A", "B", and "C", respectively.

TABLE 3

Comparison for Arabic Keyboard Layouts

| Layout Type | Fitness Value | Relative Performance |
|---|---|---|
| Layout 600 | 21,469,270 | 100% |
| A | 23,191,090 | 91.9% |
| B | 29,355,050 | 63.3% |
| C | 26,253,600 | 77.7% |

Layout 600 gives 9% relative increase in the typing speed. Moreover, layout 600 solves some of the problems found in the current Arabic keyboard layouts. Layout 600 gives better allocation for the frequently used letters such as Thal "ذ". Also, it provides an optimum typist's performance, comfort, and trainability.

TABLE 4

Stroke Distributions in Percent
(space bar excluded and shift key with upper letters not included)

| Distribution | Keyboard 600 | | Keyboard "A" | | Keyboard "B" | | Keyboard "C" | |
|---|---|---|---|---|---|---|---|---|
| HAND | | | | | | | | |
| Left | 41.77 | | 43.18 | | 54.85 | | 60.94 | |
| Right | 58.23 | | 56.82 | | 43.33 | | 39.05 | |
| RAW | | | | | | | | |
| Top | 0.15 | | 1.12 | | 0 | | 0 | |
| Upper | 21.33 | | 23.85 | | 23.32 | | 21.27 | |
| Home | 55.44 | | 57.36 | | 57.69 | | 57.00 | |
| Bottom | 23.08 | | 17.67 | | 17.17 | | 21.72 | |
| FINGER | | | | | | | | |
| | Left | Right | Left | Right | Left | Right | Left | Right |
| Little | 3.89 | 8.78 | 6.89 | 7.53 | 5.75 | 7.35 | 7.33 | 5.30 |
| Ring | 6.72 | 8.51 | 8.00 | 14.99 | 10.30 | 7.38 | 11.90 | 7.38 |
| Middle | 9.40 | 12.61 | 11.84 | 8.79 | 10.76 | 10.71 | 12.44 | 10.71 |
| Index | 21.00 | 28.33 | 16.45 | 25.50 | 28.04 | 17.89 | 29.27 | 15.66 |

It should be noticed from Table 4 of stroke distributions that on keyboard 600 the hands are evenly loaded, slightly lighter for the weaker left hand. The loading of fingers is in a qualitative agreement with the conjectured strengths of the fingers. Keyboard 600 has a beneficial low level of awkward sequence rate, and a high rate of alternate hand stroking has been obtained.

Alternate Embodiments

Although the systems and methodologies for providing an ergonomic keyboard layout have been described in language specific to an optimized ergonomic Arabic keyboard layout and other structural features and/or methodological operations or actions, it is understood that the implementations defined in the appended claims are not necessarily limited to the specific features or actions described. For example, the described methods may be employed using any subject language or other distribution algorithms. Accordingly, the specific features and operations of the described methods for providing an ergonomic keyboard layout, and resulting optimized ergonomic Arabic keyboard layout, are disclosed as exemplary forms of implementing the claimed subject matter.

What is claimed is:

1. An optimized Arabic keyboard comprising:
   a first, topmost row of keys including ؤ and Arabic numerals 1 through 9 and 0;
   a lower, second row of keys including ظ, ض,ص,ق, ف, خ, ج, ح, ه, ع, غ, and ء; ;
   a third row of keys including ط, ث, ت, ب, ل, ا, ن, م, و, س, and ش;
   a fourth row of keys including ئ, ء, د, لا, ي, ى, ر, ز, ك, and ة, wherein
   the ؤ key shifted is shaddah $\overset{\circ}{○}$;
   the ظ key shifted is fathah $\overset{\prime}{○}$;
   the ض key shifted is tanween fathah $\overset{"}{○}$;
   the ص key shifted is dammah $\overset{\prime}{○}$;
   the ق key shifted is shaddah madmoma $\overset{\prime\prime}{○}$;
   the ط key shifted is kasra $\underset{\prime}{○}$;
   the ث key shifted is tanween kasrah $\underset{"}{○}$; and the ذ key shifted is sukun $\overset{°}{○}$.

2. The optimized Arabic keyboard of claim 1, wherein:
   the first row of keys includes, from left to right, ؤ as the left most key and Arabic numerals 1 through 9 and 0;
   the second row of keys includes, from left to right, ظ, ض,ص,ق, ف, غ, ع, ه, ح, ج, خ, and ء;
   the third row of keys includes, from left to right, ط, ث, ت, ب, ل, ا, ن, م, و, س, and ش; and
   the fourth row of keys includes, from left to right, ئ, ء, د, لا, ي, ى, ر, ز, ك, and ة. .

3. The keyboard of claim 1, wherein the first row also includes ؤ as the left most key.

4. The keyboard of claim 1, wherein:
   the ف key shifted is لآ;
   the غ key shifted is {;
   the ل key shifted is لأ;
   the ا key shifted is أ
   the ي key shifted is لإ; and
   the ى key shifted is آ.

5. The keyboard of claim 1, wherein:
   the ع key shifted is ';
   the ه key shifted is ÷;
   the ح key shifted is ×;
   the ج key shifted is ʼ;
   the خ key shifted is <;
   the ء key shifted is >;
   the ت key shifted is [;
   the ب key shifted is ];
   the ن key shifted is -;
   the م key shifted is ʻ;
   the و key shifted is /;
   the س key shifted is ∶;
   the ش key shifted is ";
   the ئ key shifted is ~;
   the د key shifted is {;
   the لا key shifted is };
   the ر key shifted is ';
   the ز key shifted is ÷;
   the ك key shifted is ×; and
   the ة key shifted is ¢

6. The optimized Arabic keyboard of claim 1, wherein:
the ق, ف, غ, ع, ه, ت, ب, ل, ا, ن, م, د, لا, ي, ى, and ر keys are disposed for striking by the index or middle fingers of a keyboard user.

7. The optimized Arabic keyboard of claim 1, wherein:
the ظ, خ, ء, ط, س, ش, ئ, and ة keys are disposed for striking with the pinky fingers of a keyboard user.

8. An optimized Arabic keyboard comprising:

a topmost row of keys including ؤ as the left most key and Arabic numerals 1 through 9 and 0;

ق, ف, غ, ع, ه, ت, ب, ل, ا, ن, م, د, لا, ي, ى, and ر keys are disposed in a central portion of the keyboard for striking by the index or middle fingers of a keyboard user;

ظ, خ, ء, ط, س, ش, ئ, and ة keys are disposed in a peripheral area of the keyboard for striking with the pink fingers of a keyboard user; and ض, ص, ح, ج, ث, و, ذ, ز, and ك keys are disposed in an area of the keyboard between the central portion and the peripheral area, wherein:

the ؤ key shifted is shaddah ّ ;

the ظ key shifted is fathah َ ;

the ض key shifted is tanween fathah ً ;

the ص key shifted is dammah ُ ;

the ق key shifted is shaddah madmoma ٌ ;

the ط key shifted is kasrah ِ ;

the ث key shifted is tanween kasrah ٍ ; and the ذ key shifted is sukun ْ .

9. The keyboard of claim 8, wherein:

the ف key shifted is لآ;

the غ key shifted is إ;

the ل key shifted is لأ;

the ا key shifted is أ the ي key shifted is لآ; and the ى key shifted is آ.

10. The keyboard of claim 8, wherein:

the ع key shifted is ';

the ه key shifted is ÷;

the ح key shifted is ×;

the ج key shifted is ';

the خ key shifted is <;

the ء key shifted is >;

the ت key shifted is [;

the ب key shifted is ];

the ن key shifted is -;

the م key shifted is ';

the و key shifted is /;

the س key shifted is :;

the ش key shifted is ";

the ئ key shifted is ~;

the د key shifted is {;

the لا key shifted is };

the ر key shifted is ';

the ز key shifted is ÷;

the ك key shifted is ×; and the ة key shifted is '.

* * * * *